Oct. 13, 1936. P. W. GAENSSLE 2,057,628
WHEEL RIM
Original Filed July 9, 1932 2 Sheets-Sheet 1
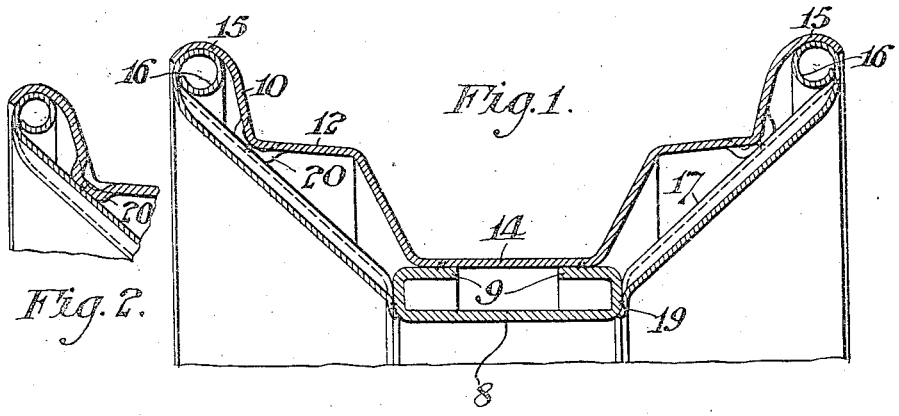
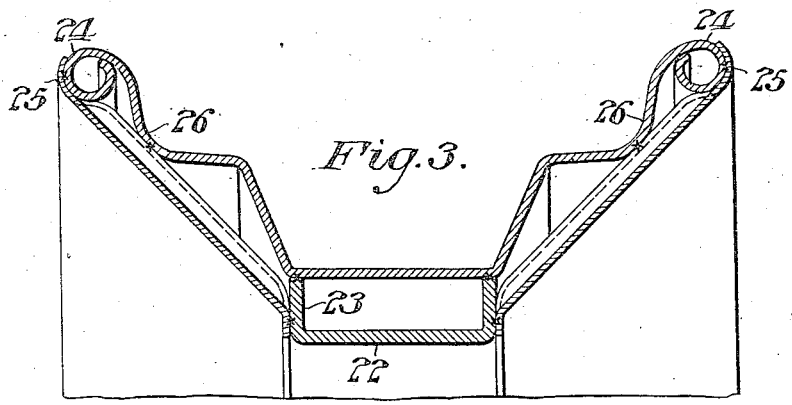
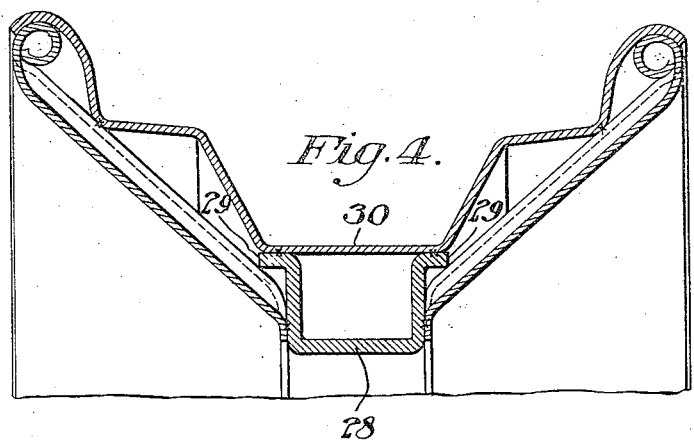
INVENTOR.
Paul W. Gaenssle,
BY
John P. Tarbox
ATTORNEY.

Oct. 13, 1936.    P. W. GAENSSLE    2,057,628
WHEEL RIM
Original Filed July 9, 1932    2 Sheets-Sheet 2
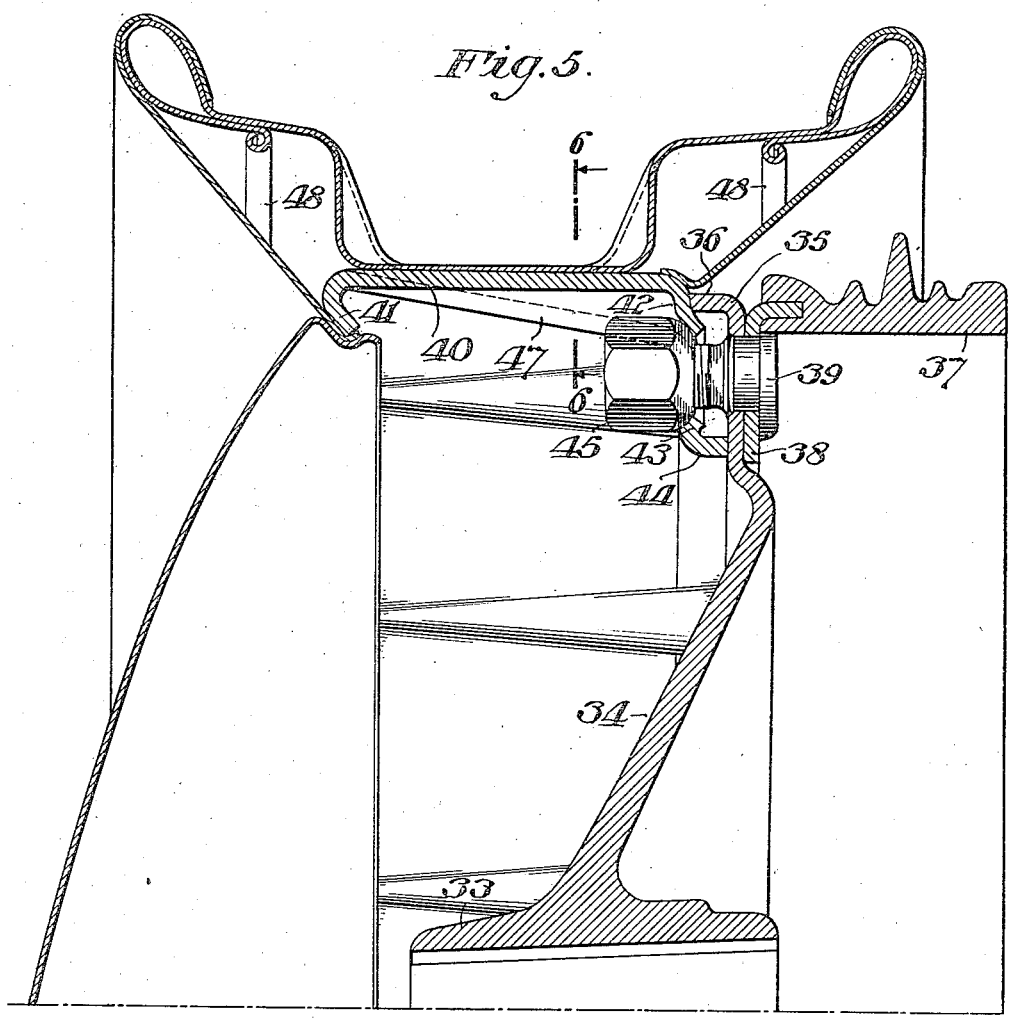
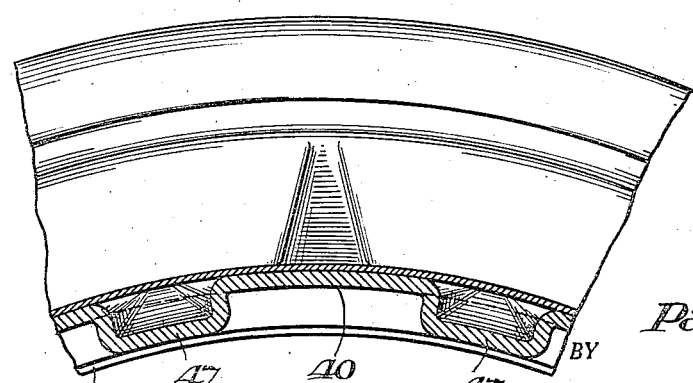
INVENTOR.
Paul W. Gaenssle,
BY
ATTORNEY.

Patented Oct. 13, 1936

2,057,628

UNITED STATES PATENT OFFICE 2,057,628

WHEEL RIM

Paul W. Gaenssle, Detroit, Mich., assignor to Budd Wheel Company, Philadelphia, Pa., a corporation of Pennsylvania Application July 9, 1932, Serial No. 621,537
Renewed February 18, 1935

3 Claims. (Cl. 301—97)

My invention relates to wheel rims and particularly to sheet-metal rims for the wheels of automobiles.

A primary object of my invention is to provide a rim that shall be of substantially reduced weight, without sacrificing necessary strength, and that shall be conducive to ready manufacture by known fabricating methods.

Another object of my invention is to provide a light-weight wheel rim that shall constitute a novel composite of thin-gauge and heavy-gauge sheet-metal component elements, wherein the heavy-gauge structure constitutes a minor portion of the total bulk of the rim, but reinforces the light-gauge element or elements to render the latter more effective.

A further object of my invention is to provide a wheel rim that shall be simple and durable in construction, economical to manufacture and effective in its operation.

In modern automobile practice, rims of relatively heavy-gauge sheet metal, usually constructed in one piece, have been extensively employed but these are considerably heavier than the rim of my invention, employing light-gauge sheet metal.

In connection with bicycles and other light-weight devices, it has been suggested to employ sheet-metal wheel rims of gauges commensurate with the loads imposed thereon, but most of these rims have been of such simple axial perimetral contours as to present little difficulty in manufacture.

In modern automobile practice, rims of complicated axial perimetral contours are employed which, in rims of solid-section, are of more or less ready manufacture.

However, in attempting to construct rims of such contours from thin-gauge sheet metal, in the forms of hollow shells, difficulties arise in interbracing the walls, assembling the parts and in other features.

It is therefore, one of my aims to expedite the construction of such rims and, in contra-distinction to solid-section rims instead of having the rim constructed entirely of heavy, or of thin-gauge, sheet metal, I construct it as a composite of thin-gauge and heavy-gauge sheet parts.

The heavy-gauge part is formed, and related to the thin-gauge portion, to add negligible weight to the rim and to provide a base for the thin-gauge part. This construction provides new distribution of forces, constitutes the heavy-gauge portion a mounting for attaching the rim to spokes, or to a mounting plate, and has other advantages.

The heavy-gauge base, constituting a small portion of the total bulk of the rim, is preferably in the form of a radially inner annulus of channel section, which, in co-operation with a radially-outer perimetral annulus of thin gauge, constitutes an annulus of substantially box section, whereby great strength is obtained in the load-plane of the wheel and a firm anchorage is provided for the light-gauge parts against axial stresses.

In a specific form, the base annulus is of radially outwardly opening substantially channel section, having its radially-outermost perimetral edges against the center portion of a thin-gauge sheet-metal structure of drop-center form which also has side-flange and tire-base portions.

Perimetral side elements, of thin-gauge sheet metal and preferably of substantially conical axial section, substantially constitute trusses, or are in truss-beam form, in axial section, extending between the thin-gauge side flanges and the heavy-gauge base, and are preferably provided with radial reinforcing ribs.

The thin-gauge parts provide wall portions of spaced multiple-layer thickness that are laterally reinforced, as by portions pressed out of one of the layers against the other.

Also, perimetral beads may be provided, in the space between the above-mentioned layers, against one or both of the layers, or in spaced relation to one of them.

In another form of the invention, the heavy-gauge base element may be constituted to render the rim of the demountable type. In this structure, one side of the channel base is radially inwardly extended to provide rim-bolt mounting seats and perimetrally-spaced axial angle braces are provided to render the structure of rigid substantially bracket form.

Figure 1, of the accompanying drawings, is a view, in axial section, through the perimeter of a rim constructed in accordance with my invention, Fig. 2 is a view, similar to a portion of Fig. 1, taken through a slightly perimetrally offset axial section thereof, Figs. 3 and 4 are views, similar to Fig. 1, of modified forms of the invention, Fig. 5 is an axial view of a further modified form of the invention, showing also, wheel and brake-drum elements associated therewith, and Fig. 6 is a view, taken substantially along the line 6—6 of Fig. 5.

Referring to Figs. 1 and 2, a radially-inner annulus or base element 8, of relatively heavy-gauge sheet metal, is of substantially channel section, opening radially outwardly but having axial outer perimetral portions 9 projecting toward each other.

A radially-outer perimetral element, of light-gauge sheet metal, includes side-flange portions 10, tire-base portions 12 and a drop-center portion 14, to which the portions 9 may be secured, as by welding, as indicated.

Perimetral side elements, also of thin-gauge sheet metal and preferably of conical axial section, are provided with inturned outer perimetral beads 16, disposed in nested relation to turned radially outer perimetral portions 15 of the side flanges 10, radial reinforcing side ribs 17, preferably of channel section, and radially inner perimetral portions 19 embracing the base element 8 and secured thereto, as by welding.

The outer and side perimetral elements constitute the main bulk of a drop-center rim having a standard internal contour corresponding to that of the one-piece heavy gauge rims above mentioned, but rendering the walls of spaced multiple-layer thickness. Reinforcing portions 20 of substantially cup-shape are pressed out of the outer perimetral element, at the intersections of its portions 10 and 12, to engage the side elements, at the adjacent bottoms of the ribs 17, to provide reinforcements between the parts and to facilitate spot welding. The base member 8 and the portion 14, together constitute a rigid support of substantially box section, and the side elements, being connected between the flanges 10 and the base 8 in the form of truss beams, also assist in bracing the thin-gauge parts.

In the modification of the invention, shown in Fig. 3, a radially-inner perimetral element 22 corresponds to the element 8, except for the omission of the portions 9 thereof, and has side walls 23 welded to the outer structure.

Instead of having beads corresponding to the bead 16 on the side elements, as in the structure of Fig. 1, the radially outer element is provided with beads 24 and the side elements are provided with turned portions 25 in partial conforming and nested relation thereto. Portions 26 between the side-flange and tire-base portions are disposed directly against the radial ribs on the side elements and welded thereto.

In the form of the invention, shown in Fig. 4, a base element 28 is provided at the outer perimeters of the sides thereof, with axial flanges 29, projecting away from each other, which are welded to a drop-center portion 30 of the outer perimetral element. The latter is welded directly to the radial ribs, at the intersection of its side-flange and tire-base portions, as in the structure of Fig. 3, and has a structure, at the outer radial limits of the side flanges, similar to that of Fig. 1.

Referring to Figs. 5 and 6, a wheel comprises a hub 33, a conical disc 34 and an outer-perimetral rim-mounting portion 35 including an axial flange 36. At the rear side of the portion 35, a brake-drum member 37 has a wheel-plane portion 38 secured to the disc 34, as by studs 39.

A heavy-gauge base annulus 40 has a slightly inturned front perimetral flange 41 and a rear perimetral flange 42, of greater radial inward extent, disposed against the flange 36 and constituting means for mounting the rim on the disc. The portion 42 has conical seats 43 and an inner perimetral axial flange 44, co-operating with the portion 35 of the disc 34, to space the seats 43 from the disc and to receive cap nuts 45 for holding the rim in position. Axial ribs 47, preferably of channel section and convergingly tapered from the flange 42 toward the flange 41, constitute axial angle braces between the parts 40 and 42; the heavy gauge inner perimetral member thus constituting, in axial section, substantially a bracket or truss element supported at one end against the disc.

The thin-gauge outer perimetral element has the side-flange portions thereof return bent and provided with annular beads 48, under the tire base portions, in spaced relation to the side elements.

In each of the structures, a salient feature of advantage resides in the construction of the side elements whereby they may be mounted on the outer element from the sides thereof. If the two side elements were combined in one piece, they could be assembled on the outer element only with difficulty, since they are radially substantially co-extensive therewith.

In the device of my invention, all of the annular elements are so constructed as to be readily fabricated by known die-press and welding operations and to receive each other in the axial direction, in a structure that is of substantially minimum weight for a given amount of material, simple, neat and compact in construction and an improvement generally in its field.

I am aware of many simple sheet-metal rim structures heretofore suggested, but they either do not present difficulties, as mentioned in connection with a rim of the drop center type, or do not overcome them in the practical effective manner obtained in my invention.

While I have shown and described particular forms of my invention, changes may be effected therein without departing from the spirit and scope thereof, as set forth in the appended claims.

What I claim is:

1. A sheet-metal wheel rim including a portion of spaced-layer thickness and a reinforcing portion of substantially cup-shape pressed out of one of said layers against the other.

2. A light weight rim structure comprising drop center well, flanking bead seats, and tire retaining flanges and a reinforcement therefor in the form of a conical annulus the elements of the cone of which are substantially rectilinear and are joined by welding respectively to the periphery of one tire retaining flange and the apex of the angle between the tire retaining flange and the bead seat, and are joined also to the bottom of the drop center well, whereby to bridge the angle formed by a well side wall and the adjacent bead seat.

3. A light weight rim construction comprising drop center well, bead seats and tire retaining flanges, a channel cross-section felloe of substantially the width of the bottom of the drop center well and connected with said bottom only, and a reinforcing annulus bridging the angle formed between a bead seat, and the adjacent side wall of the drop center well and connected respectively to the adjacent tire retaining flange, the apex of the angle formed between the flange and the bead seat and to said channel cross section felloe in a region removed a distance from said drop center well.

PAUL W. GAENSSLE.